(12) United States Patent
Cameron

(10) Patent No.: US 7,539,790 B1
(45) Date of Patent: May 26, 2009

(54) REDUCING LATENCY IN SCSI PROTOCOL

(75) Inventor: Douglas J. Cameron, Woodinville, WA (US)

(73) Assignee: 3PAR, Inc., Fremont, CA (US)

( * ) Notice: Subject to any disclaimer, the term of this patent is extended or adjusted under 35 U.S.C. 154(b) by 305 days.

(21) Appl. No.: 11/280,828

(22) Filed: Nov. 15, 2005

(51) Int. Cl.
*G06F 5/00* (2006.01)
*G06F 13/28* (2006.01)

(52) U.S. Cl. ............... 710/52; 710/22; 710/23; 710/24; 710/56

(58) Field of Classification Search ........... 710/22, 710/23, 24, 52, 53, 56; 709/236, 237
See application file for complete search history.

(56) References Cited

U.S. PATENT DOCUMENTS

| | | | | | |
|---|---|---|---|---|---|
| 5,388,219 | A | * | 2/1995 | Chan et al. | 710/5 |
| 5,603,063 | A | * | 2/1997 | Au | 710/52 |
| 5,937,426 | A | * | 8/1999 | Sokolov | 711/113 |
| 6,363,438 | B1 | * | 3/2002 | Williams et al. | 710/22 |
| 6,421,723 | B1 | * | 7/2002 | Tawil | 709/224 |
| 2004/0227972 | A1 | * | 11/2004 | Uchikawa | 358/1.14 |
| 2005/0120222 | A1 | * | 6/2005 | Mitsuoka et al. | 713/182 |

\* cited by examiner

*Primary Examiner*—Niketa I Patel
*Assistant Examiner*—Juanito C Borromeo
(74) *Attorney, Agent, or Firm*—Patent Law Group LLP; David C. Hsia

(57) ABSTRACT

To communicate over a SCSI protocol, a first device allocates buffers for a dummy SCSI read command and sends the dummy SCSI read command to a second device. This dummy SCSI read command is not a request by the first device to read data from the second device but instead is an indication that the first device is ready to receive data from the second device. In response, the second device stores the dummy SCSI read command to a command queue until the second device wishes to send data to the first device. At that time, the second device removes the dummy SCSI read command from the command queue and sends a response to the dummy SCSI read command to the first device. This response includes data that the second device wishes to send to the first device. The first device then delivers the received data to a higher layer process.

11 Claims, 3 Drawing Sheets

REDUCING LATENCY IN SCSI PROTOCOL

FIELD OF INVENTION

This invention relates to a method for reducing latency in Small Computer Systems Interface (SCSI) protocol.

DESCRIPTION OF RELATED ART

FIG. 1 illustrates systems 102 and 122 having processes that use the conventional SCSI protocol to transport data between the systems. System 102 may be a primary system that writes data to a secondary system 122 for backup purposes. Alternatively, systems 102 and 122 can be any initiator and target involved in a SCSI write operation (e.g., a host computer and a SCSI disk drive).

System 102 has a process 104 that writes data using a SCSI protocol layer 106. A Fibre Channel (FC) protocol mapping layer 108 maps SCSI protocol layer 106 onto a FC physical layer 110. FC physical layer 110 is connected by an FC communication link 111 to the corresponding FC physical layer 130. System 122 is similar to system 102 and includes a process 124, SCSI protocol layer 126, FC protocol mapping layer 128, and FC physical layer 130.

FIG. 2 illustrates a SCSI write from an initiator to a target. In step 202, the initiator sends a write command to write data to the target. The write command includes a logical unit number, a block offset, and a block count to identify the destination of the write in the target. In step 204, the target validates the command parameters and prepares buffers to receive the data from the initiator. Command validation involves, for example, verifying that the block range identified by the block offset and the block count are contained within the identified logical unit. The target then sends a request for data command to the initiator. In step 206, the initiator sends the data to the target. In step 208, the target processes the data in the buffers, for example by storing the data in the buffers to a disk drive, and sends a completion status to the initiator. In step 210, the initiator receives the completion status from the target.

As can be seen, the SCSI write has a command phase consisting of the command transmission from steps 202 to 204, a data phase consisting of the data transmissions from steps 204 to 206 and from steps 206 to 208, and a status phase consisting of the status transmission from steps 208 to 210. Having separate command and data phases requires an extra round trip on the communication link between the initiator and the target. When the communication link has a long latency, this extra round trip becomes a significant portion of the overall command latency. Thus, what is needed is a method to reduce the latency of the SCSI write command.

SUMMARY

In one embodiment of the invention, a method is provided for two processes to communicate over the SCSI protocol. A first device allocates buffers for a dummy SCSI read command and sends the dummy SCSI read command to a second device. This dummy SCSI read command is not a request by the first device to read data from the second device but an indication that the first device is ready to receive data from the second device. In response, the second device stores the dummy SCSI read command to a command queue until the second device wishes to send data to the first device. At that time, the second device removes the dummy SCSI read command from the command queue and sends a response to the dummy SCSI read command to the first device. This response includes data that the second device wishes to send to the first device. The first device then delivers the received data to a higher layer process.

BRIEF DESCRIPTION OF THE DRAWINGS

Use of the same reference numbers in different figures indicates similar or identical elements.

DETAILED DESCRIPTION

Figure 3:
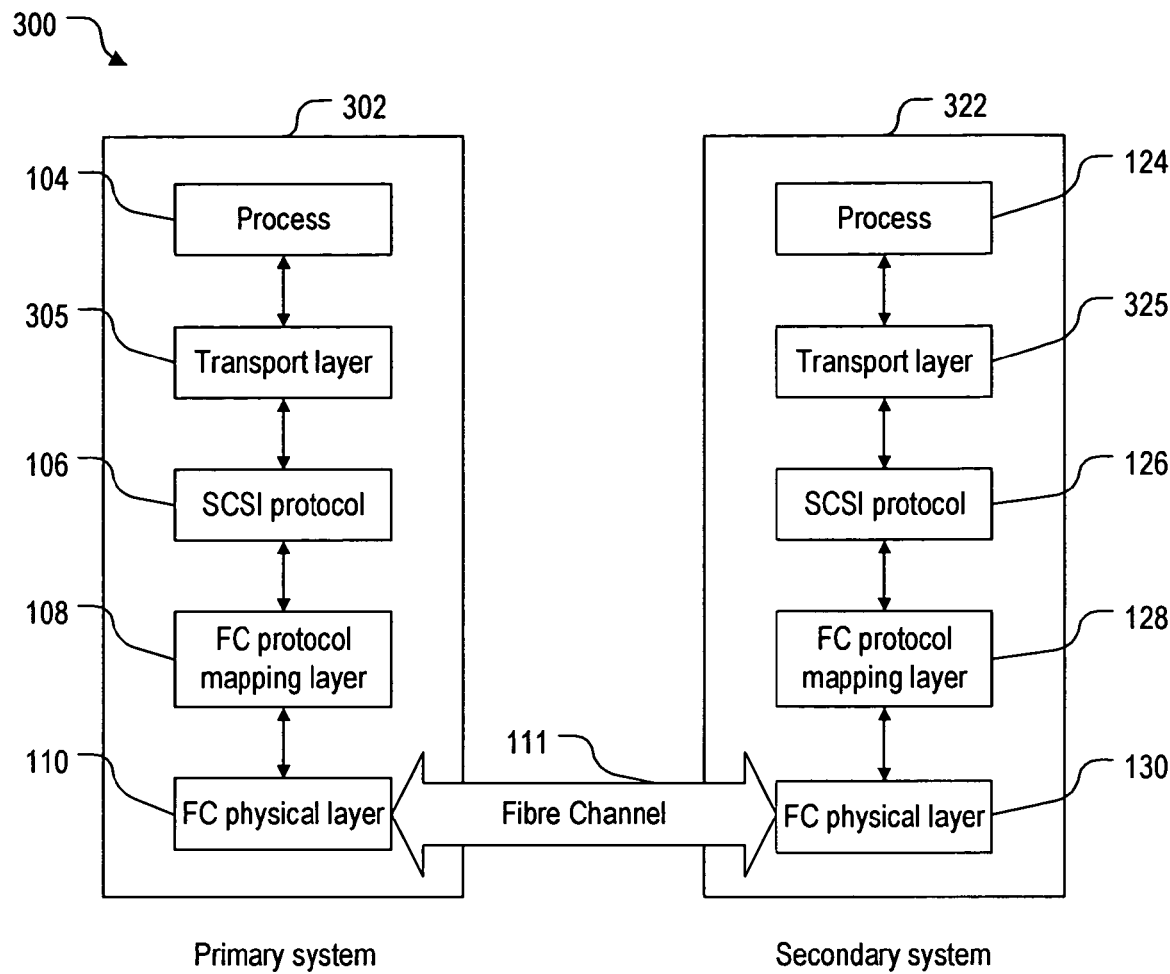
FIG. 3 illustrates a system for two systems to communicate over SCSI protocol in one embodiment of the invention.

FIG. 3 illustrates systems 302 and 322 having processes that use the conventional SCSI protocol to transport data between the systems. System 302 may be a primary system that writes data to a secondary system 322 for backup purposes. In one embodiment, systems 302 and 322 are InServ® Storage Servers running InForm® Operating System and 3PAR® Remote Copy software all available from 3PARdata, Inc. of Fremont, Calif. 3PAR® Remote Copy software copies data from primary system 302 to secondary system 322 for disaster recovery purposes. In other embodiments, SCSI protocol can be mapped over other physical interfaces to transport data between systems 302 and 322. In other embodiments, systems 302 and 322 can be any initiator and target involved in a SCSI write operation (e.g., a host computer and a SCSI drive).

Figure 1:
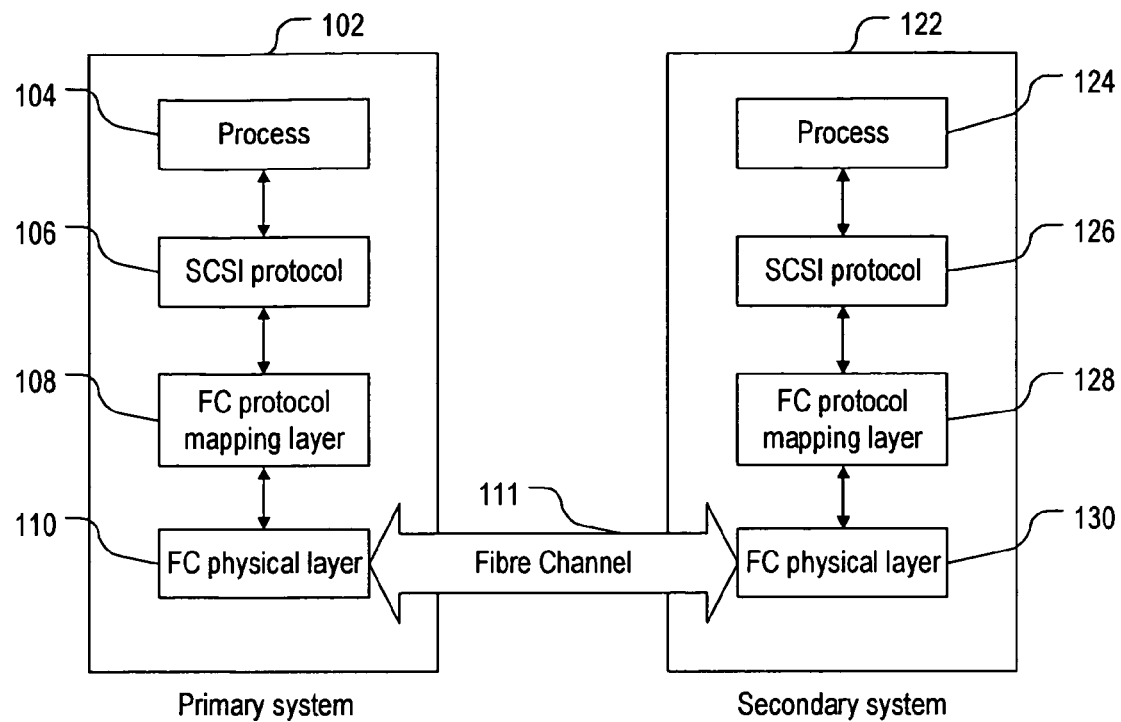
FIG. 1 illustrates systems using conventional SCSI protocol to transport data between the systems.
Figure 2:
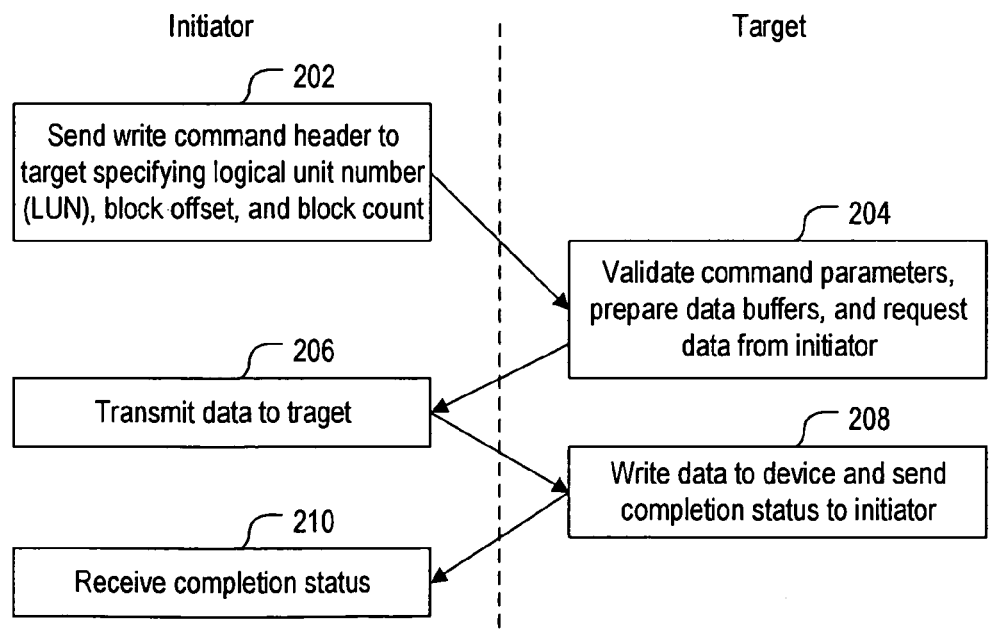
FIG. 2 is a flowchart of a conventional SCSI write by an initiator to a target.

Systems 302 and 322 are similar to systems 102 and 122 (FIG. 1) described above except that system 302 has a data transport layer 305 between process 104 and SCSI protocol layer 106 while system 322 has a data transport layer 325 between process 124 and SCSI protocol 126. Transport layers 305 and 325 act to reduce latency in data transmission over the SCSI protocol by issuing pre-allocated SCSI read commands between systems 302 and 322 and then use responses to the pre-allocated SCSI read commands to send data between systems 302 and 322. For example, process 104 would issue a send command to data transport layer 305 in system 302, and data transport layer 305 would transmit the data via a SCSI response to a pre-allocated dummy SCSI read command from system 322.

Figure 4:
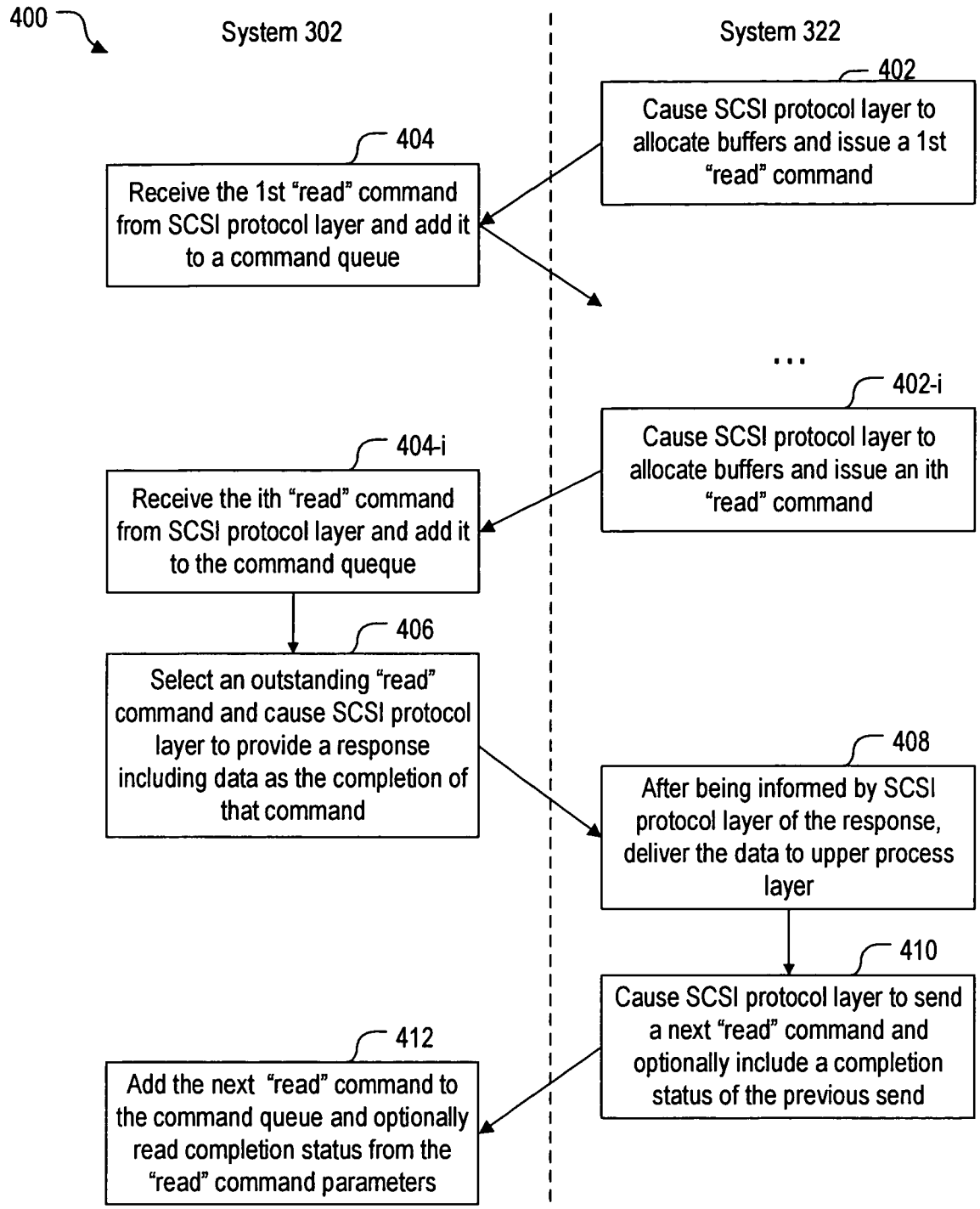
FIG. 4 is a flowchart for two systems to communicate over SCSI protocol in one embodiment of the invention.

FIG. 4 is a flowchart of a method 400 for systems 302 and 322 to communicate over SCSI protocol in one embodiment of the invention. To illustrate method 400, assume that system 302 will be sending data to system 322. The roles of systems 302 and 322 are reversed when system 322 sends data to system 302. Furthermore, both systems are senders and recipients in bi-directional data exchanges. Note that method 400 can be applied to traditional SCSI protocol over parallel SCSI physical interface in addition to SCSI over FC physical interface.

In step 402, data transport layer 325 in system 322 causes SCSI protocol 126 to (1) allocate buffers in the system memory for storing data received in response to a dummy SCSI read command and (2) issue the dummy SCSI read command to system 302. A dummy SCSI read command is a pre-allocated SCSI read command issued by system 322 to system 302 even though system 322 does not wish to read any data from system 302. The pre-allocated SCSI read command indicates to system 302 that system 322 is ready to receive data from system 302.

In a conventional SCSI read from a SCSI initiator to a SCSI target, the SCSI read command includes a command ID and a destination in the SCSI target. The destination may include a logical unit number (LUN), a block offset, and a block count to identify where the data is to be written in the SCSI target.

On the other hand, the dummy SCSI read command includes only a command ID because system 322 does not have any data it wishes to read from system 302. The dummy SCSI read command indicates that that system 322 is ready to receive data from system 302.

In step 404, data transport layer 305 in system 302 receives the dummy SCSI read command through SCSI protocol layer 106 and adds it in a command queue to be used later when system 302 wishes to send data to system 322.

Steps 402 and 404 are followed by similar steps 402-*i* and 404-*i* to provide additional dummy SCSI read commands until the command queue is filled with dummy SCSI read commands.

In step 406, process 104 in system 302 has data it wishes to send to system 322. Process 104 issues a send command with a destination as system 322 and the data to be sent to data transport layer 305 in system 302. In response, data transport layer 305 removes a dummy SCSI read command from the command queue and causes SCSI protocol layer 106 to send a response to the dummy SCSI read command. The response includes the command ID of the dummy SCSI read command and the data to be written to system 322.

In step 408, SCSI protocol layer 126 informs data transport layer 325 that a response has been received for a dummy SCSI read command. Transport layer 325 delivers the received data to the upper layer process (e.g., process 124).

In step 410, data transport layer 325 in system 322 again causes SCSI protocol layer 26 to (1) allocate buffers in the system memory for another dummy SCSI read command and (2) send the dummy SCSI read command to system 302 through SCSI protocol layer 126. Data transport layer 325 optionally causes SCSI protocol layer 126 to include a completion status of the write from system 302 in the dummy SCSI read command.

In step 412, data transport layer 305 in system 302 receives the dummy SCSI read command through SCSI protocol layer 106 and puts it in a command queue to be used later when system 302 wishes to send data to system 322. Data transport layer 305 optionally reads the completion status from the dummy SCSI read command and provides the completion status to process 104.

In one embodiment, data transport layers 305 and 325 have timeout mechanisms to minimize the effect from any loss of commands and data in physical link 111 between systems 302 and 322. Data transport layer 305 issues an empty response to a dummy SCSI read command that has been in the command queue after a timeout period (e.g., X minutes). Data transport layer 325 cancels an outstanding dummy SCSI read command and frees its allocated buffers after that dummy SCSI read command has been issued after a timeout period (e.g., 2× minutes). After canceling the dummy SCSI read command, data transport layer 325 allocates buffer for another dummy SCSI read command and sends that dummy SCSI read command to system 302.

Various other adaptations and combinations of features of the embodiments disclosed are within the scope of the invention. Numerous embodiments are encompassed by the following claims.

What is claimed is:

1. A method for communicating over Small Computer Systems Interface (SCSI) protocol, comprising:
a first device:
allocating buffers for a dummy SCSI read command; and
sending the dummy SCSI read command to a second device when the first device does not wish to read any data from the second device, wherein the dummy SCSI read command indicates that the first device is ready to receive a write from the second device;
the second device adding the dummy SCSI read command to a command queue; and
when the second device wishes to write data to the first device, the second device:
removing the dummy SCSI read command from the command queue; and
sending a response to the dummy SCSI read command to the first device as the write, the response including the data that the second device wishes to write to the first device.

2. The method of claim 1, further comprising:
the first device allocating other buffers for another dummy SCSI read command and sending the another dummy SCSI read command to the second device; and
the second device adding the another dummy SCSI read command to the command queue.

3. The method of claim 1, further comprising:
the first device allocating other buffers for another dummy SCSI read command and sending the another dummy SCSI read command to the second device;
the first device including a completion status of the dummy SCSI read command in the another dummy SCSI read command; and
the second device reading the completion status from the another dummy SCSI read command.

4. The method of claim 1, further comprising:
the second device removing the dummy SCSI read command from the command queue and sending an empty response to the dummy SCSI read command when the dummy SCSI read command has been in the command queue for a timeout period.

5. The method of claim 1, further comprising:
the first device canceling the dummy SCSI read command and freeing the buffers allocated for the dummy SCSI read command when the dummy SCSI read command has been outstanding for a timeout period; and
the first device allocating other buffers for another dummy SCSI read command and sending the another dummy SCSI read command to the second device.

6. A method for a data transport layer in a first device to communicate over Small Computer Systems Interface (SCSI) protocol with a second device, comprising:
receiving a dummy SCSI read command from the second device through a SCSI protocol layer when the second device does not wish to read any data from the first device, wherein the dummy SCSI read command indicates the second device is ready to receive a write from the first device;
adding the dummy SCSI read command to a command queue; and
when there is data to write to the second device;
removing the dummy SCSI read command from the command queue; and
causing the SCSI protocol layer to send a response to the dummy SCSI read command to the second device as the write, the response including the data to be written to the second device.

7. The method of claim 6, further comprising:
receiving another dummy SCSI read command through the SCSI protocol layer from the second device when the second device does not wish to read any data from the first device;
adding the another dummy SCSI read command to the command queue; and
when there is additional data to write to the second device, removing the another dummy SCSI read command from the command queue and causing the SCSI protocol layer to send another response to the another dummy SCSI read command to the second device, the another response including the additional data to be written to the second device.

8. The method of claim 6, further comprising:
receiving another dummy SCSI read command through the SCSI protocol layer from the second device when the second device does not wish to read any data from the first device; and
reading a completion status of the dummy SCSI read command in the another dummy SCSI read command.

9. The method of claim 6, further comprising:
removing the dummy SCSI read command from the command queue and causing the SCSI protocol layer to send an empty response to the dummy SCSI read command when the dummy SCSI read command has been in the command queue for a timeout period.

10. The method of claim 1, wherein the dummy SCSI read command includes only a command ID and is devoid of any destination to indicate that the first device is ready to receive the write from the second device.

11. The method of claim 6, wherein the dummy SCSI read command includes only a command ID and is devoid of any destination to indicate that the second device is ready to receive the write from the first device.

* * * * *